(12) United States Patent
Liu

(10) Patent No.: US 11,929,774 B1
(45) Date of Patent: Mar. 12, 2024

(54) ADAPTIVE METHOD FOR MULTI-ORDER MULTI-BAND ANTI-INTERFERENCE INTELLIGENT UWB ANTENNA

(71) Applicant: CHANGSHA CHIXIN SEMICONDUCTOR TECH CO., LTD., Changsha (CN)

(72) Inventor: Jianjun Liu, Changsha (CN)

(73) Assignee: CHANGSHA CHIXIN SEMICONDUCTOR TECH CO., LTD., Changsha (CN)

( * ) Notice: Subject to any disclaimer, the term of this patent is extended or adjusted under 35 U.S.C. 154(b) by 0 days.

(21) Appl. No.: 18/516,285

(22) Filed: Nov. 21, 2023

Related U.S. Application Data

(63) Continuation of application No. PCT/CN2023/125084, filed on Oct. 18, 2023.

(30) Foreign Application Priority Data

Nov. 8, 2022 (CN) .......................... 202211389564.X

(51) Int. Cl.
  *H04B 1/12* (2006.01)
  *H04B 1/04* (2006.01)
  *H04B 1/10* (2006.01)

(52) U.S. Cl.
  CPC ........... *H04B 1/123* (2013.01); *H04B 1/0475* (2013.01); *H04B 1/1027* (2013.01)

(58) Field of Classification Search
  CPC combination set(s) only.
  See application file for complete search history.

(56) References Cited

U.S. PATENT DOCUMENTS

| 7,369,598 B2 * | 5/2008 | Fontana ............. H04B 1/71637 |
| | | 455/93 |
| 7,567,786 B2 * | 7/2009 | Bjerede .................... H04B 1/48 |
| | | 455/196.1 |

(Continued)

FOREIGN PATENT DOCUMENTS

| CN | 102053186 A | 5/2011 |
| CN | 107706523 A | 2/2018 |

OTHER PUBLICATIONS

Written Opinion of the International Searching Authority dated Dec. 13, 2023, in counterpart International Patent Application No. PCT/CN2023/125084 (5 pages in English, 4 pages in Chinese).

(Continued)

*Primary Examiner* — Quochien B Vuong
(74) *Attorney, Agent, or Firm* — NSIP Law

(57) ABSTRACT

The present invention provides an adaptive method for a multi-order multi-band anti-interference intelligent UWB antenna, comprising: acquiring a band of an interference source, wherein the band of the interference source comprises a single band, a double band and a triple band; when the interference source is a single band, starting a single-band first-order filtering interference suppression scheme; when the single-band first-order filtering interference suppression scheme does not reach a standard, starting a single-band second-order filtering interference suppression scheme; when the single-band second-order filtering interference suppression scheme does not reach the standard, starting a single-band third-order filtering interference suppression scheme; when the interference source is a double band, starting a double-band first-order filtering interference suppression scheme; when the double-band first-order filtering interference suppression scheme does not reach the standard, starting a double-band second-order filtering interference suppression scheme; and when the interference (Continued)

source is a triple band, starting a triple-band third-order filtering interference suppression scheme. The present invention provides an adaptive method for a multi-order multi-band anti-interference intelligent UWB antenna, which achieves the suppression of external interference signals by the multi-order multi-band of the UWB receiver.

9 Claims, 3 Drawing Sheets

(56) References Cited

U.S. PATENT DOCUMENTS

| | | | | |
|---|---|---|---|---|
| 8,644,360 B2* | 2/2014 | Liu | ....................... | H04B 1/7176 |
| | | | | 375/237 |
| 8,818,314 B2* | 8/2014 | Kapoor | ................ | H04B 1/1036 |
| | | | | 455/296 |
| 11,228,413 B2* | 1/2022 | An | ....................... | H04B 17/336 |

OTHER PUBLICATIONS

International Search Report dated Dec. 13, 2023, in counterpart International Patent Application No. PCT/CN2023/125084 (3 pages in Chinese).

* cited by examiner

ADAPTIVE METHOD FOR MULTI-ORDER MULTI-BAND ANTI-INTERFERENCE INTELLIGENT UWB ANTENNA

TECHNICAL FIELD

The present invention relates to the field of UWB technology, and in particular to an adaptive method for a multi-order multi-band anti-interference intelligent UWB antenna.

BACKGROUND ART

The UWB (Ultra Wide Band) technology is a carrier-free communication technology that transmits data using non-sinusoidal narrow pulses on the order of nanoseconds to microseconds. Therefore, it occupies a large spectral range. Despite the use of wireless communication, its data transmission rate can reach hundreds of megabits per second or more. The UWB technology has the advantages of low system complexity, low power spectral density of emission signals, being insensitive to channel fading, low interception ability, high positioning accuracy, strong penetration ability, etc. It is especially suitable for high-speed wireless access in indoor and other dense multipath sites.

Meanwhile, with the rapid development of mobile communication and Internet of things, the use of bands is becoming more and more intensive. Since a UWB system occupies an extremely wide bandwidth, it has to share the spectrum with existing narrow-band systems. With the development and application of various other band wireless systems, the existing band resources become more and more tense, and the contradiction between the increasing functional requirements and the limited spectrum resources becomes more and more obvious. For example, the fourth generation (4G) and fifth generation (5G) mobile communication standards, Bluetooth, Wimax and WiFi bands among different operators. There is an overlap problem between the operating bands of these systems and the UWB communication systems. In order to reduce the mutual interference between the UWB system and other systems and ensure the normal operation of each communication system, the next generation of UWB system is required to adopt relevant anti-interference technology. In order to suppress potential interference between the UWB system and a plurality of different standard narrow-band systems, it is often necessary to introduce a plurality of bandstop filters within the UWB system. These bandstop filters are required to use multiple ones to correspond to different frequencies and multiple cascades to improve the anti-interference effect. This will undoubtedly increase the size, complexity and cost of the system.

Therefore, it is necessary to provide an adaptive method for a multi-order multi-band anti-interference intelligent UWB antenna, which can solve the above problems.

SUMMARY OF THE INVENTION

The present invention provides an adaptive method for a multi-order multi-band anti-interference intelligent UWB antenna, which achieves the suppression of external interference signals by the multi-order multi-band of the UWB receiver.

The embodiment of the present invention provides an adaptive method for a multi-order multi-band anti-interference intelligent UWB antenna, comprising: acquiring a band of an interference source, wherein the band of the interference source comprises a single band, a double band and a triple band; when the interference source is a single band, starting a single-band first-order filtering interference suppression scheme; when the single-band first-order filtering interference suppression scheme does not reach a suppression standard, starting a single-band second-order filtering interference suppression scheme; when the single-band second-order filtering interference suppression scheme does not reach the suppression standard, starting a single-band third-order filtering interference suppression scheme; when the interference source is a double band, starting a double-band first-order filtering interference suppression scheme; when the double-band first-order filtering interference suppression scheme does not reach the suppression standard, starting a double-band second-order filtering interference suppression scheme; when the interference source is a triple band, starting a triple-band third-order filtering interference suppression scheme; wherein the interference suppression scheme comprises controlling switching of a first group of bandstop filtering switches of a first region, a second group of bandstop filtering switches of a second region and a third group of bandstop filtering switches of a third region.

Preferably, the bands of the interference source include 3.5 GHz, 4.9 GHz and 5.5 GHz.

Preferably, the first region is a printed monopole antenna on-board region; the second region is a microstrip feed conduction band side region; and the third region is a metal floor.

Preferably, the first group of bandstop filtering switches, the second group of bandstop filtering switches and the third group of bandstop filtering switches are formed by etching a plurality of gaps or loading a plurality of metal branches on the antenna to generate resonance using the plurality of gaps or the plurality of metal branches.

Preferably, the first group of bandstop filtering switches comprises a first filter, a second filter and a third filter; the states formed by the first, second and third filters after switching comprise forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed; the second group of bandstop filtering switches comprises a fourth filter, a fifth filter and a sixth filter; the states formed by the fourth, fifth and sixth filters after switching comprise forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed; the third group of bandstop filtering switches comprises a seventh filter, an eighth filter and a ninth filter; and the states formed by the seventh, eighth and ninth filters after switching comprise forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed.

Preferably, 64 states are formed after switching the first group, the second group and the third group of bandstop filtering switches, wherein 1 state is bandstop-free filtering, 21 states are single-bandstop filtering, 36 states are double-bandstop filtering, and 6 states are triple-bandstop filtering.

Preferably, the single-band first-order filtering interference suppression scheme comprises performing switch switching on one group of the first group, the second group and the third group of bandstop filtering switches to form a single-bandstop filtering, wherein the single-bandstop filtering has 9 states; the single-band second-order filtering interference suppression scheme comprises performing switch switching on two groups of the first group, the second group and the third group of the bandstop filtering switches to form a single-bandstop filtering, wherein the single-bandstop filtering has 9 states; and the single-band third-order filtering interference suppression scheme comprises performing switch switching on the first group, the second group and the third group of bandstop filtering switches to form a single-bandstop filtering, wherein the single-bandstop filtering has three states.

Preferably, the double-band first-order filtering interference suppression scheme comprises performing switch switching on two groups of the first group, the second group and the third group of the bandstop filtering switches to form a double-bandstop filtering, wherein the double-bandstop filtering has 9 states; the double-band second-order filtering interference suppression scheme comprises performing switch switching on the first group, the second group and the third group of bandstop filtering switches to form a double-bandstop filtering, wherein the double-bandstop filtering has 9 states. Preferably, the triple-band third-order filtering interference suppression scheme comprises performing switch switching on the first group, the second group and the third group of bandstop filtering switches to form a triple-bandstop filtering, wherein the triple-bandstop filtering has 6 states.

Preferably, the first group of bandstop filtering switches of the first region, the second group of bandstop filtering switches of the second region and the third group of bandstop filtering switches of the third region are switched by MCU feedback control.

Compared to the prior art, the technical solutions of embodiments of the present invention have the following advantageous effects.

The embodiments of the present invention provide an adaptive method for a multi-order multi-band anti-interference intelligent UWB antenna, comprising: acquiring a band of an interference source, wherein the band of the interference source comprises a single band, a double band and a triple band; when the interference source is a single band, starting a single-band first-order filtering interference suppression scheme; when the single-band first-order filtering interference suppression scheme does not reach a suppression standard, starting a single-band second-order filtering interference suppression scheme; when the single-band second-order filtering interference suppression scheme does not reach the suppression standard, starting a single-band third-order filtering interference suppression scheme; when the interference source is a double band, starting a double-band first-order filtering interference suppression scheme; when the double-band first-order filtering interference suppression scheme does not reach the suppression standard, starting a double-band second-order filtering interference suppression scheme; and when the interference source is a triple band, starting a triple-band third-order filtering interference suppression scheme. The interference suppression scheme comprises controlling the switching of the first group of bandstop filtering switches of the first region, the second group of bandstop filtering switches of the second region and the third group of bandstop filtering switches in the third region, thereby achieving the suppression of external interference signals by the multi-order and multi-band of the UWB receiver by implementing different multi-order filtering interference suppression schemes for different band interference sources.

BRIEF DESCRIPTION OF THE DRAWINGS

In order to more clearly describe the technical solutions in the embodiments of the invention or prior art, the following will briefly introduce the drawings to be used in the description of the embodiments or the prior art. It will be apparent to those skilled in the art that the drawings in the following description are only some embodiments, not all, of the invention. For a person of ordinary skill in the art, other drawings may be obtained from the drawings without involving any inventive effort.

DETAILED DESCRIPTION OF THE INVENTION

In order to make the objectives, technical solutions, and advantages of embodiments of the invention clearer, the technical solutions in the embodiments of the invention will be described clearly and completely in conjunction with the accompanying drawings in the embodiments of the invention. Obviously, the described embodiments are part of the invention, rather than all of the embodiments. Based on the embodiments in the invention, all other embodiments obtained by a person skilled in the art without involving any inventive effort are within the scope of protection of the invention.

Hereinafter, embodiments of the present invention will be described in detail with reference to specific embodiments. The following specific embodiments may be combined with one another, and the same or similar concepts or processes may not be repeated in some embodiments.

Based on the problems existing in the prior art, the embodiments of the present invention provide an adaptive method for a multi-order multi-band anti-interference intelligent UWB antenna, which achieves the suppression of external interference signals by the multi-order multi-band of the UWB receiver.

Figure 1:
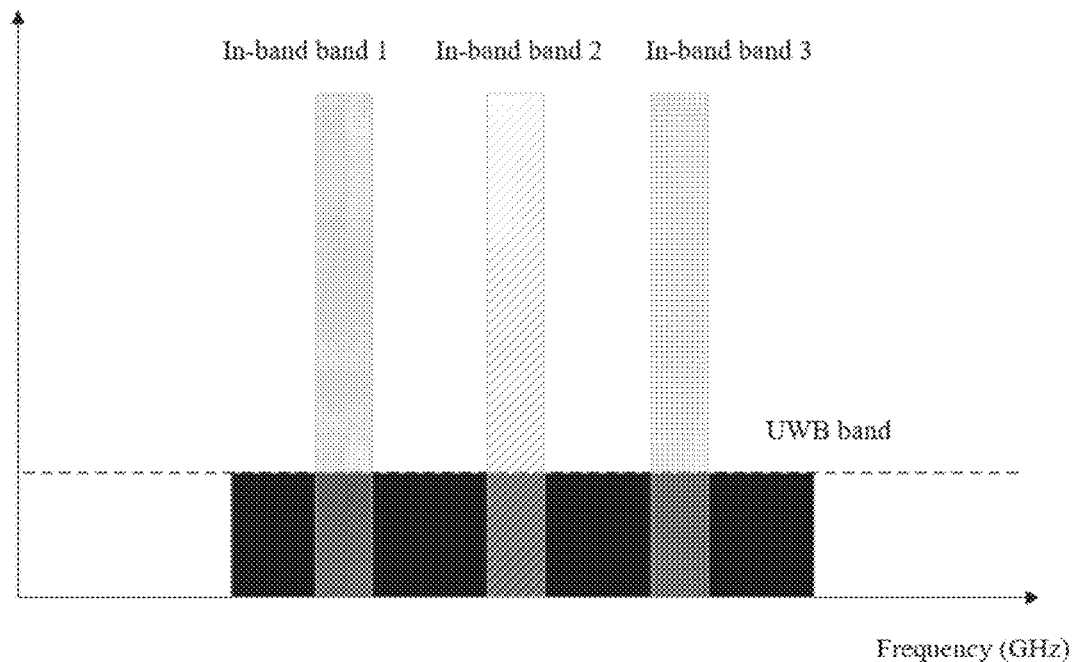
FIG. 1 is a schematic diagram of three communication bands coexisting with a UWB band in an embodiment of the present invention.

FIG. 1 is a schematic diagram of three communication bands coexisting with a UWB band in an embodiment of the present invention. Referring now to FIG. 1, FIG. 1 shows three communication bands coexisting with the UWB, i.e., an in-band band 1, an in-band band 2 and an in-band band 3. Since these three communication bands overlap with the UWB band, inter-system interference inevitably occurs.

Figure 2:
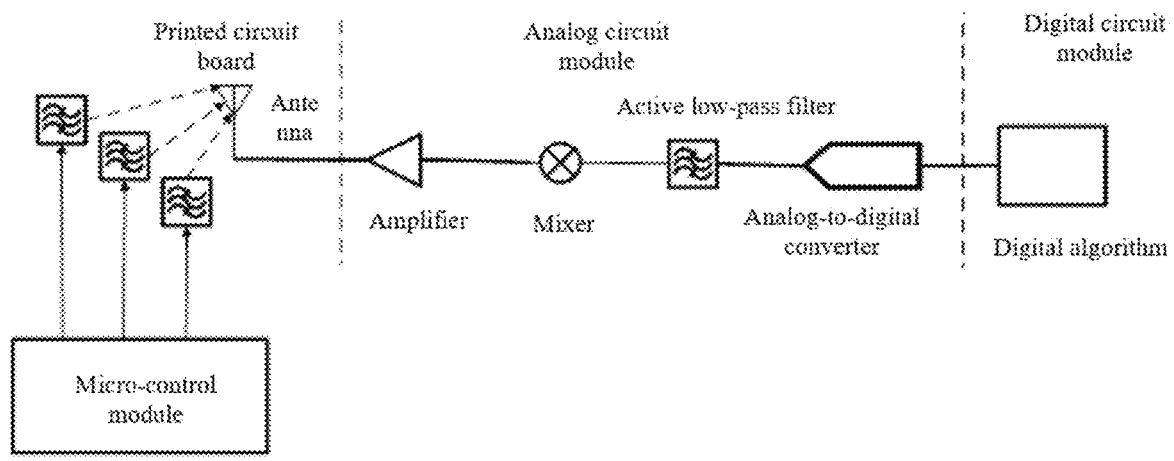
FIG. 2 is a schematic diagram of an anti-interference UWB receiving circuit according to an embodiment of the present invention.

FIG. 2 is a schematic diagram of an anti-interference UWB receiving circuit according to an embodiment of the present invention. Referring now to FIG. 2, the anti-interference UWB receiving circuit involves modules and components including an UWB antenna (ANT), an amplifier (AP), a mixer, an active low-pass filter (LPF), an analog-to-digital converter (ADC), a digital algorithm, and a micro-control module (MCU) that controls antenna performance.

The active low-pass filter of the anti-interference UWB receiving circuit is used for enhancing reception of useful signals. The active low-pass filter may be an integration of a filter and an active amplifier, or may be a separate filter and a separate active amplifier. The antenna of the anti-interference UWB receiving circuit is used for transmitting and receiving UWB signals. As a key component of UWB system, the characteristics of antenna will directly affect the transmission performance of the system. Since the UWB system has a wide band, when receiving a signal, the conventional UWB antenna inevitably receives an external interference signal, and the interference signal cannot be separated by a digital algorithm. To avoid interference from external signals to the UWB system, multiple filters may be placed between different modules and components. The UWB systems divide a circuit into multiple parts, with one or more filter units added to each circuit component or module part associated node. However, the mounting and placement of the filter unit on multiple nodes of the circuit inevitably increases the size and complexity of the system. The filtering function is added to three regions of the UWB antenna shown in FIG. 2, and these three regions are respectively connected to the MCU micro-control module. Without increasing the original size and volume, the UWB antenna shown in FIG. 2 may increase the anti-interference performance of the UWB system by adjusting its own structure, loading gaps and metal branches, and implementing multiple filter nodes with different structures on the antenna. The frequencies and intensities corresponding to these filters may be generated by radio frequency (RF) electronic switches on the antenna in a plurality of states. The RF electronic switch is connected to the MCU micro-control module to control the opening and closing of the switch so as to manage different states corresponding to the filter. The MCU micro-control module feeds back to control the electronic switches on the metal printed resonant branches and the etched resonant gaps to perform anti-interference processing on signals of different types, intensities and bands. By controlling the switching state of the antenna, the requirements of intelligent variable filtering are achieved, and the reconfigurable characteristics of the whole anti-interference UWB receiving circuit are realized.

Figure 3:
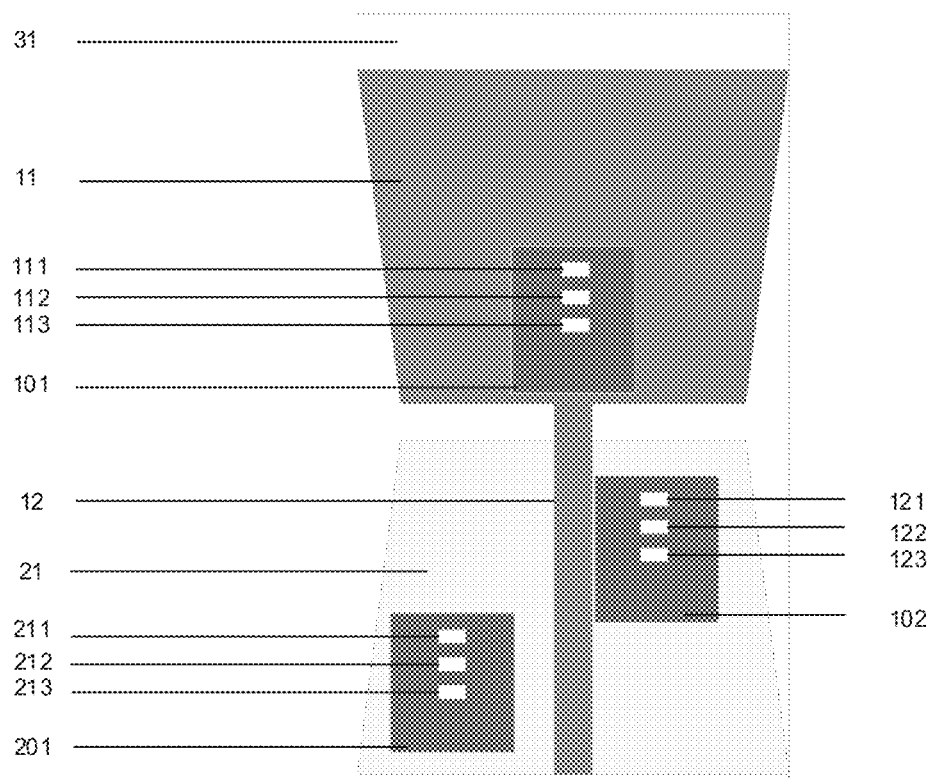
FIG. 3 is a schematic plan view of a multi-order multi-frequency anti-interference UWB intelligent printed antenna according to an embodiment of the present invention.

FIG. 3 is a schematic plan view of a multi-order multi-frequency anti-interference UWB intelligent printed antenna according to an embodiment of the present invention. Referring now to FIG. 3, the antenna includes a metal printed monopole antenna board 11, a microstrip feeder conducting strip 12, a metal floor 21 and a dielectric substrate 31. The metal printed monopole antenna board 11 is arranged on a front side of the dielectric substrate 31. The metal printed monopole antenna board 11 is configured to radiate in an UWB communication band. The metal floor 21 is arranged on an opposite surface of the dielectric substrate 31. The shape of the metal floor 21 corresponds to that of the metal printed monopole antenna board 11, and can effectively serve as a part of an antenna matching circuit and participate in the radiation of the antenna, so as to ensure that the antenna may cover the whole UWB band of 3.1-10.6 GHz.

Figure 4:
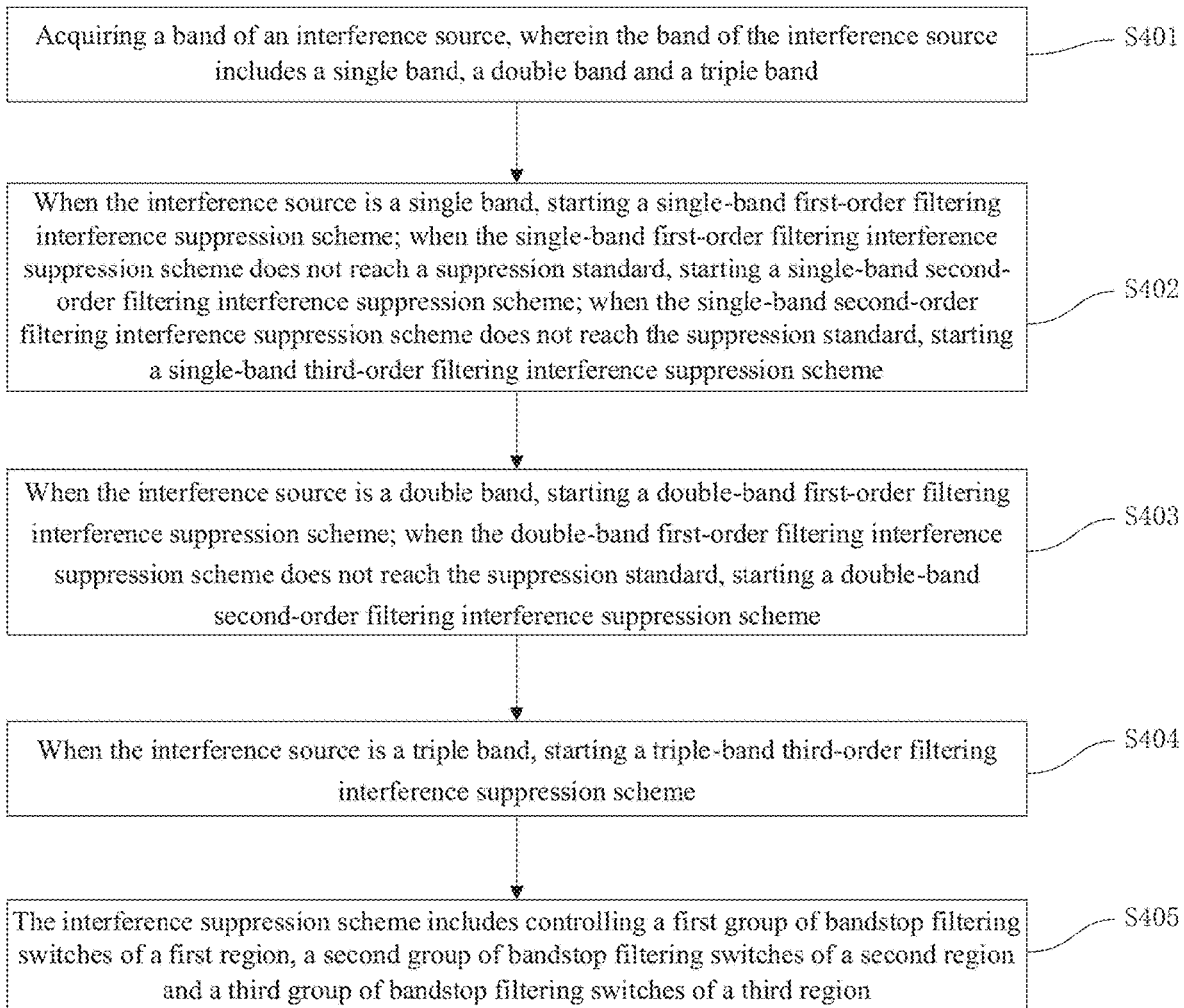
FIG. 4 is a flow chart of an adaptive method for a multi-order multi-band anti-interference intelligent UWB antenna according to an embodiment of the present invention.

FIG. 4 is a flow chart of an adaptive method for a multi-order multi-band anti-interference intelligent UWB antenna according to an embodiment of the present invention. Referring now to FIG. 4, the present invention provides an adaptive method for a multi-order multi-band anti-interference intelligent UWB antenna, including: Step S401, acquiring a band of an interference source, wherein the band of the interference source includes a single band, a double band and a triple band. In particular implementations, the bands of the interference source include 3.5 GHz, 4.9 GHz and 5.5 GHz.

Step S402, when the interference source is a single band, starting a single-band first-order filtering interference suppression scheme; when the single-band first-order filtering interference suppression scheme does not reach a suppression standard, starting a single-band second-order filtering interference suppression scheme; when the single-band second-order filtering interference suppression scheme does not reach the suppression standard, starting a single-band third-order filtering interference suppression scheme.

Step S403, when the interference source is a double band, starting a double-band first-order filtering interference suppression scheme; when the double-band first-order filtering interference suppression scheme does not reach the suppression standard, starting a double-band second-order filtering interference suppression scheme. Step S404, when the interference source is a triple band, starting a triple-band third-order filtering interference suppression scheme.

Step S405, the interference suppression scheme includes controlling switching of a first group of bandstop filtering switches of a first region, a second group of bandstop filtering switches of a second region and a third group of bandstop filtering switches of a third region.

In a particular implementation, the first group of bandstop filtering switches of the first region, the second group of bandstop filtering switches of the second region and the third group of bandstop filtering switches of the third region are switched by MCU feedback control.

The first region is a printed monopole antenna on-board region; the second region is a microstrip feed conduction band side region; and the third region is a metal floor. In a particular implementation, the first group of bandstop filtering switches, the second group of bandstop filtering switches and the third group of bandstop filtering switches are formed by etching a plurality of gaps or loading a plurality of metal branches on the antenna to generate resonance using the plurality of gaps or the plurality of metal branches.

Referring now to FIG. 3, the first region 101 is a region where a filter is disposed on the printed monopole antenna board 11. 111, 112, 113 are a first filter, a second filter, and a third filter, respectively. These three filters represent different operating states and may be operated at different frequencies by switching of electronic switches, which are controlled by MCU via the feedback. The second region 102 is a region where filters are arranged near the side of the microstrip feeder conduction band 12, and 121, 122, 123 are a fourth filter, a fifth filter, and a sixth filter, respectively. These three filters represent different operating states and may be operated at different frequencies by switching of electronic switches, which are controlled by MCU via the feedback. The third region 201 is a region where filters are arranged on the metal floor 21, and 211, 212, 213 are a seventh filter, an eighth filter, and a ninth filter, respectively. These three filters represent different operating states and may be operated at different frequencies by switching of electronic switches, which are controlled by MCU via the feedback.

In order to prevent the UWB system from interfering with 3.5 GHz band (5G standard of China Unicom and China Telecom), 4.9 GHz band (5G standard of China Mobile) and 5.5 GHz band (5G standard of WiFi), the feedback MCU achieves anti-interference means with different strengths and bands by switching electronic switches. In a specific implementation, the first group of bandstop filtering switches includes a first filter, a second filter and a third filter; the states formed by the first, second and third filters after switching include forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed.

TABLE 1

| Switches | 111 | 112 | 113 | Resonance frequency | States |
|---|---|---|---|---|---|
| A1 | 0 | 0 | 0 | 3.5 GHz | Bandstop filtering |
| B1 | 0 | 0 | 1 | 4.9 GHz | Bandstop filtering |
| C1 | 0 | 1 | 0 | 5.5 GHz | Bandstop filtering |
| D1 | 1 | 0 | 0 | Out-band | Pass band |
| C1 | 0 | 1 | 1 | 5.5 GHz | Bandstop filtering |
| D1 | 1 | 0 | 1 | Out-band | Pass band |
| D1 | 1 | 1 | 0 | Out-band | Pass band |
| D1 | 1 | 1 | 1 | Out-band | Pass band |

As shown in Table 1, the three groups of switches 111, 112, 113 of the first filter, the second filter and the third filter have eight switching modes, and finally four different filtering states are formed on the first region 101. There are four different states. A1 forms a bandstop filtering state with the center frequency of 3.5 GHz. B1 forms a bandstop filtering state with the center frequency of 4.9 GHz. C1 forms a bandstop filtering state with the center frequency of 5.5 GHz. D1 does not form filtering, and there is no anti-interference requirement in the whole UWB band. The A1 state is that the three groups of switches 111, 112 and 113 of the first filter, the second filter and the third filter are switched on simultaneously. The resonant gap length corresponding to the filter is the longest, the central operating frequency is the lowest, and the resonant frequency of the corresponding bandstop filter is 3.5 GHz. The 1 state is that the two groups of switches 111 and 112 of the first filter and the second filter are switched on simultaneously, and the group of switches 113 of the third filter are switched off. As the group of switches 113 of the third filter are closed, the corresponding resonant gap length of the filter decreases, the center operating frequency increases, and the corresponding bandstop filter resonant frequency is 4.9 GHz. The CI state is that the group of switches 111 of the first filter are switched on, the group of switches 112 of the second filter are switched off, and the group of switches 113 of the third filter are switched on or off. As the group of switches 112 of the second filter are closed, the corresponding resonant gap length of the filter further decreases, the center operating frequency increases, and the corresponding bandstop filter resonant frequency is 5.5 GHz. In the CI state, the group of switches 112 of the second filter play a decisive role. Since the switch 113 is at the end of the gap, there is no effect on the C1 state. The DI state is that the group of switches 111 of the first filter are switched off, the group of switches 112 of the second filter are switched on or off, and the group of switches 113 of the third filter are switched on or off. Since the group of switches 111 of the first filter are switched off, the corresponding resonant gap length of the filter is relatively minimum, the central operating frequency increases again, and the corresponding resonant frequency of the bandstop filter exceeds the highest frequency point of the UWB system. In the DI state, the group of switches 111 of the first filter play a decisive role. The two groups of switches 112 and 113 of the second filter and the third filter are at a certain physical distance from the operating resonant gap and do not affect the D1 state. The second group of bandstop filtering switches includes a fourth filter, a fifth filter and a sixth filter; the states formed by the fourth, fifth and sixth filters after switching include forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed.

TABLE 2

| Switches | 121 | 122 | 123 | Resonance frequency | States |
|---|---|---|---|---|---|
| A2 | 0 | 0 | 0 | 3.5 GHz | Bandstop filtering |
| B2 | 0 | 0 | 1 | 4.9 GHz | Bandstop filtering |
| C2 | 0 | 1 | 0 | 5.5 GHz | Bandstop filtering |
| D2 | 1 | 0 | 0 | Out-band | Pass band |
| C2 | 0 | 1 | 1 | 5.5 GHz | Bandstop filtering |
| D2 | 1 | 0 | 1 | Out-band | Pass band |
| D2 | 1 | 1 | 0 | Out-band | Pass band |
| D2 | 1 | 1 | 1 | Out-band | Pass band |

As shown in Table 2, it shows corresponding states when the three groups of switches 121, 122, 123 of the fourth filter, the fifth filter, and the sixth filter on the second region 102 are switched on and off. The group of switches of the sixth filter 123 is placed at the edge of the resonant branch. The group of switches of the fifth filter 122 is placed more centrally with respect to the group of switches 123 of the sixth filter. The group of switches 121 of the fourth filter is placed more centrally with respect to the group of switches 122 of the fifth filter. As shown in Table 2, the three groups of switches 121, 122, 123 of the fourth filter, the fifth filter, and the sixth filter have eight switching modes and finally form four different filtering states on the second region 102. There are four different states. A2 forms a bandstop filtering state with the center frequency of 3.5 GHz. B2 forms a bandstop filtering state with the center frequency of 4.9 GHz. C2 forms a bandstop filtering state with the center frequency of 5.5 GHz. D2 does not form filtering, and there is no anti-interference requirement in the whole UWB band. The A2 state is that the three groups of switches 121, 122 and 123 of the fourth filter, the fifth filter and the sixth filter are switched on simultaneously. The resonant branch section length corresponding to the filter is the longest, the central operating frequency is the lowest, and the resonant frequency of the corresponding bandstop filter is 3.5 GHz. The B2 state is the two groups of switches 121 and 122 of the fourth filter and the fifth filter are switched on simultaneously, and the group of switches 123 of the sixth filter are switched off. With the group of switches 123 of the sixth filter off, the corresponding resonant branch length of the filter decreases, the central operating frequency increases, and the corresponding resonant frequency of the bandstop filter is 4.9 GHz. The C2 state is the group of switches 121 of the fourth filter on, the group of switches 122 of the fifth filter off, and the group of switches 123 of the sixth filter are switched on or off. With the group of switches 122 of the fifth filter switched off, the corresponding resonant branch length of the filter further decreases, the center operating frequency further increases, and the corresponding bandstop filter resonant frequency is 5.5 GHz. In the C2 state, the group of switches 122 of the fifth filter play a decisive role. Since the group of switches 123 of the sixth filter is at the end of the gap, there is no effect on the C2 state. The D2 state is that the group of switches 121 of the fourth filter are switched off, the group of switches 122 of the fifth filter are switched on or off, and the group of switches 123 of the sixth filter are switched on or off. Since the group of switches 121 of the fourth filter are switched off, the corresponding resonant branch length of the filter is relatively minimum, the central operating frequency increases again, and the corresponding resonant frequency of the bandstop filter exceeds the highest frequency point of the UWB system. In the D2 state, the group of switches 121 of the fourth filter play a decisive role. The two groups of switches 122 and 123 of the fifth filter and the sixth filter are at a certain physical distance from the operating resonant gap and do not affect the D2 state.

The third group of bandstop filtering switches includes a seventh filter, an eighth filter and a ninth filter. The states formed by the seventh, eighth and ninth filters after switching include forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed.

TABLE 3

| Switches | 211 | 212 | 213 | Resonance frequency | States |
|---|---|---|---|---|---|
| A3 | 0 | 0 | 0 | 3.5 GHz | Bandstop filtering |
| B3 | 0 | 0 | 1 | 4.9 GHz | Bandstop filtering |
| C3 | 0 | 1 | 0 | 5.5 GHz | Bandstop filtering |
| D3 | 1 | 0 | 0 | Out-band | Pass band |
| C3 | 0 | 1 | 1 | 5.5 GHz | Bandstop filtering |
| D3 | 1 | 0 | 1 | Out-band | Pass band |
| D3 | 1 | 1 | 0 | Out-band | Pass band |
| D3 | 1 | 1 | 1 | Out-band | Pass band |

As shown in Table 3, it shows corresponding states when the corresponding states of the three groups of switches 211, 212 and 213 of the seventh filter, the eighth filter and the ninth filter corresponding to the third region 201 are switched on and off. The group of switches 213 of the ninth filter are placed at the edge of the resonant gap. The group of switches 212 of the eighth filter are placed more centrally with respect to the group of switches 213 of the ninth filter. The group of switches 211 of the seventh filter are placed more centrally with respect to the group of switches 212 of the eighth filter. As shown in Table 3, the three groups of switches 211, 212, 213 of the seventh filter, the eighth filter and the ninth filter have eight switching modes, and finally four different filtering states are formed on the third region 201. There are four different states. A3 forms a bandstop filtering state with the center frequency of 3.5 GHz. B3 forms a bandstop filtering state with the center frequency of 4.9 GHz. C3 forms a bandstop filtering state with the center frequency of 5.5 GHz. D3 does not form filtering, and there is no anti-interference requirement in the whole UWB band. The A3 state is that three groups of switches 211, 212 and 213 of the seventh filter, the eighth filter and the ninth filter are switched on simultaneously, the resonant gap length corresponding to the filter is the longest, the central operating frequency is the lowest, and the resonant frequency of the corresponding bandstop filter is 3.5 GHz. The B3 state is that the two groups of switches 211 and 212 of the seventh filter and the eighth filter are switched on simultaneously, and the group of switches 213 of the ninth filter are switched off. As the group of switches 213 of the ninth filter are closed, the corresponding resonant gap length of the filter decreases, the center operating frequency increases, and the corresponding bandstop filter resonant frequency is 4.9 GHz. The C3 state is that the group of switches 211 of the seventh filter are switched on, the group of switches 212 of the eighth filter are switched off, and the group of switches 213 of the ninth filter are switched on or off. As the group of switches 212 of the eighth filter are closed, the corresponding resonant gap length of the filter further decreases, the center operating frequency increases, and the corresponding bandstop filter resonant frequency is 5.5 GHz. In the C3 state, the group of switches 212 of the eighth filter play a decisive role. Since the group of switches 213 of the ninth filter are at the end of the gap, there is no effect on the C3 state. The D3 state is that the group of switches 211 of the seventh filter are switched off, the group of switches 212 of the eighth filter are switched on or off, and the group of switches 213 of the ninth filter are switched on or off. Since the group of switches 211 of the seventh filter are switched off, the corresponding resonant gap length of the filter is relatively minimum, the central operating frequency increases again, and the corresponding resonant frequency of the bandstop filter exceeds the highest frequency point of the UWB system. In the D3 state, the group of switches 211 of the seventh filter play a decisive role. The two groups of switches 212 and 213 of the eighth filter and the ninth filter are at a certain physical distance from the operating resonant gap and do not affect the D3 state.

The first region 101, the second region 102 and the third region 201 have different filtering states, respectively. The first region 101 may have four states of A1, B1, C1 and D1. The second region 102 can have four states of A2, B2, C2 and D2. The third region 201 may have four states of A3, B3, C3 and D3.

In a specific implementation, 64 states are formed after switching the first group, the second group and the third group of bandstop filtering switches, wherein 1 state is bandstop-free filtering, 21 states are single-bandstop filtering, 36 states are double-bandstop filtering, and 6 states are triple-bandstop filtering.

TABLE 4

| A1 | B1 | C1 | D1 |
|---|---|---|---|
| A2 A3 | A1A2 A3 | B1A2 A3 | C1A2 A3 | D1A2 A3 |
| A2 B3 | A1A2 B3 | B1A2 B3 | C1A2 B3 | D1A2 B3 |
| A2 C3 | A1A2 C3 | B1A2 C3 | C1A2 C3 | D1A2 C3 |
| A2 D3 | A1A2 D3 | B1A2 D3 | C1A2 D3 | D1A2 D3 |
| B2 A3 | A1B2 A3 | B1B2 A3 | C1B2 A3 | D1B2 A3 |
| B2 B3 | A1B2 B3 | B1B2 B3 | C1B2 B3 | D1B2 B3 |
| B2 C3 | A1B2 C3 | B1B2 C3 | C1B2 C3 | D1B2 C3 |
| B2 D3 | A1B2 D3 | B1B2 D3 | C1B2 D3 | D1B2 D3 |
| C2 A3 | A1C2 A3 | B1C2 A3 | C1C2 A3 | D1C2 A3 |
| C2 B3 | A1C2 B3 | B1C2 B3 | C1C2 B3 | D1C2 B3 |
| C2 C3 | A1C2 C3 | B1C2 C3 | C1C2 C3 | D1C2 C3 |
| C2 D3 | A1C2 D3 | B1C2 D3 | C1C2 D3 | D1C2 D3 |
| D2 A3 | A1D2 A3 | B1D2 A3 | C1D2 A3 | D1D2 A3 |
| D2 B3 | A1D2 B3 | B1D2 B3 | C1D2 B3 | D1D2 B3 |
| D2 C3 | A1D2 C3 | B1D2 C3 | C1D2 C3 | D1D2 C3 |
| D2 D3 | A1D2 D3 | B1D2 D3 | C1D2 D3 | D1D2 D3 |

Table 4 shows the superposition of 64 states formed after the switching of the bandstop filtering switches of the first group, the second group and the third group. In Table 4, the letter A represents a state of forming bandstop filtering with a center frequency of 3.5 GHz. B represents a state of forming bandstop filtering with a center frequency of 4.9

GHz. C represents a state of forming bandstop filtering with a center frequency of 5.5 GHz. D represents a state of not forming bandstop filtering in an UWB band. The numeral 1 in Table 4 represents a switch on the first region 101. The numeral 2 in Table 4 represents a switch on the second region 102. The numeral 3 in Table 4 represents a switch on the third region 201. The different alphanumeric arrangements in Table 4 represent the superposition of electronic switches on three regions of the antenna in different states. These states are classified from band as UWB without bandstop filtering, single-bandstop filtering, double-bandstop filtering and triple-bandstop filtering. These states are classified from the filter strength as first-order bandstop filtering, second-order bandstop filtering and third-order bandstop filtering.

The switches on the UWB antenna may be combined according to the requirements of anti-interference. Different schemes may be flexibly controlled by feedback MCU to achieve the purpose of adaptive intelligent reconfigurable UWB antenna.

Scenario classification for all 64 states of all states is as follows.

Scenario (1): The UWB without the bandstop filtering contains 1 state: D1D2D3.

Scenario (2): The single-band bandstop filtering includes 21 states: A1D2 D3, B1D2 D3, C1D2 D3, D1A2 D3, D1B2 D3, D1C2 D3, D1D2 A3, D1D2 B3, D1D2 C3, A1A2 D3, A1D2 A3, B1B2 D3, B1D2 B3, C1C2 D3, C1D2 C3, D1A2 A3, D1B2 B3, D1C2 C3, A1A2A3, B1B2 B3, C1C2 C3.

Scenario (3): The double-bandstop filtering contains 36 states: A1A2 B3, A1A2 C3, A1B2 A3, A1B2 B3, A1C2 A3, A1C2 C3, B1A2 A3, B1A2 B3, B1B2 A3, B1B2 C3, B1C2 B3, B1C2 C3, C1A2 A3, C1A2 C3, C1B2 B3, C1B2 C3, C1C2 A3, C1C2 B3, A1B2 D3, A1C2 D3, A1D2 B3, A1D2 C3, B1A2 D3, B1C2 D3, B1D2 A3, B1D2 C3, C1A2 D3, C1B2 D3, C1D2 A3, C1D2 B3, D1A2 B3, D1A2 C3, D1B2A3, D1B2 C3, D1C2 A3, D1C2 B3.

Scenario (4): The triple-band bandstop filtering contains 6 states: A1B2 C3, A1C2 B3, B1A2 C3, B1C2 A3, C1A2 B3, C1B2 A3.

When an external signal enters, the UWB system confirms the external signal, and the micro-control module sends an instruction. According to the instruction from the micro-control module, the receiver determines whether to start interference suppression. If the micro-control module indicates not to execute, the receiver does not start interference suppression. All the electronic switches are in an off state. As shown in Scenario (1), the switch is in a state of D1D2D3, and the processing of an external signal entering the receiver ends. If the micro-control module indicates execution, the interference suppression is initiated for the receiver. When the instruction process starts, the receiver executes the interference suppression scheme, the micro-control module controls the electronic switch, and the electronic switch of different regions on the antenna is selectively switched on. When external interference enters, the receiver performs interference suppression. Interference in the present invention refers to the 3.5 GHz band (5G standard of China Unicom and China Telecom), the 4.9 GHz band (5G standard of China Mobile) and the 5.5 GHz band (5G standard of WiFi) within the UWB 3.1 GHz-10.6 GHz. The system identifies the number of interference signals and then gives three schemes to cope with different scenarios. For a single interference signal, the micro-control module sends an instruction to perform a single-band interference suppression process. This process corresponds to Scenario (2), and single-band bandstop filtering includes 21 states. For two interference signals, the micro-control module sends an instruction to perform a double-band interference suppression process. The process corresponds to Scenario (3), and the double-bandstop filtering includes 36 states. For three interference signals, the micro-control module sends an instruction to perform a triple-band interference suppression process. The process corresponds to Scenario (4), and the triple-band interference filtering includes 6 states.

In a specific implementation, the single-band first-order filtering interference suppression scheme comprises performing switch switching on one group of the first group, the second group and the third group of bandstop filtering switches to form a single-bandstop filtering, wherein the single-bandstop filtering has 9 states; the single-band second-order filtering interference suppression scheme comprises performing switch switching on two groups of the first group, the second group and the third group of the bandstop filtering switches to form a single-bandstop filtering, wherein the single-bandstop filtering has 9 states; and the single-band third-order filtering interference suppression scheme comprises performing switch switching on the first group, the second group and the third group of bandstop filtering switches to form a single-bandstop filtering, wherein the single-bandstop filtering has three states.

When implementing a single-band interference suppression scheme, the system first identifies the class of interference signals and then identifies the strength of the interference signals. According to the strength of the external signal, the micro-control module issues an instruction whether or not high-order filtering is required for interference suppression. When a single-band interference suppression scheme is implemented, the external interference signal band is one of a 3.5 GHz band, a 4.9 GHz band and a 5.5 GHz band. Firstly, when an interference suppression instruction is sent out, the micro-control module starts a single-band first-order interference suppression scheme. Namely, a group of bandstop filtering switches of only one region of the three regions of the first region 101, the second region 102 and the third region 201 need to be switched on. This scheme corresponds to 9 of the 21 states in this Scenario (2): A1D2 D3, B1D2 D3, C1D2 D3, D1A2 D3, D1B2 D3, D1C2 D3, D1D2 A3, D1D2 B3, D1D2 C3. That is, the first-order interference suppression scheme has nine ways to suppress signal interference. Since three bands are involved, there are three ways for each band to perform the first-order interference suppression. Each of these three modes, when executed, externally exhibits a first-order bandstop filtering state of the same specific band. After executing the single-band first-order interference suppression scheme, the micro-control unit judges whether the receiver has reached the interference suppression criterion. If the criteria for interference suppression are met, processing of the external signal into the receiver ends. If the standard of interference suppression is not met, it is necessary to perform feedback reprocessing on the interference suppression of the receiver by the interference signal, and the micro-control module starts a single-band second-order interference suppression scheme. That is, the first region 101, the second region 102 the second region 102 and the third region 201 require a group of bandstop filtering switches of the same resonant frequency of two regions to be simultaneously switched on. This scheme corresponds to 9 of the 21 states in this Scenario (2): A1A2 D3, A1 D2 A3, 11 B2 D3, B1D2 B3, C1C2 D3, C1D2 C3, D1A2 A3, D1B2 B3, D1C2 C3. That is, the second-order interference suppression scheme also has 9 ways to suppress signal interference. Since three bands are involved, there are three ways to perform the second-order interference suppression for each band. Likewise, each of these three modes, when executed, externally exhibits a second-order bandstop filtering state of the same specific band. After executing the second-band first-order interference suppression scheme, the micro-control unit judges whether the receiver has reached the interference suppression criterion. If the criteria for interference suppression are met, processing of the external signal into the receiver ends. If the standard of interference suppression is not met, it is necessary to perform feedback reprocessing once again on the interference suppression of the receiver by the interference signal, and the micro-control module starts a third-band second-order interference suppression scheme. That is, the first region 101, the second region 102 the second region 102 and the third region 201 require a group of bandstop filtering switches of the same resonant frequency of three regions to be simultaneously switched on. This scheme corresponds to 3 of the 21 states in this Scenario (2): A1A2 A3, B1B2 B3, C1C2 C3. That is, the third order filtering interference suppression scheme also has three ways to suppress signal interference. Since three bands are involved, there is one way for each band to perform the third-order filtered interference suppression. The adopting of the single-band third-order filtering interference suppression scheme is on condition that both the first-order filtering interference suppression scheme and the second-order filtering interference suppression scheme may not meet the interference suppression standard. The third-order filtering interference suppression may improve the strength of interference suppression as much as possible, so as to achieve the final requirements of interference suppression. After the feedback single-band third-order filtering interference suppression scheme is adopted, the interference suppression of the UWB receiver is completed, and the processing of the single external interference signal entering the receiver ends.

In a specific implementation, the double-band first-order filtering interference suppression scheme comprises performing switch switching on two groups of the first group, the second group and the third group of the bandstop filtering switches to form a double-bandstop filtering, wherein the double-bandstop filtering has 9 states; and the double-band second-order filtering interference suppression scheme comprises performing switch switching on the first group, the second group and the third group of bandstop filtering switches to form a double-bandstop filtering, wherein the double-bandstop filtering has 9 states.

When there are two types of external interference signals, the UWB receiver implements a double-band interference suppression scheme. Likewise, the system first identifies the class of interference signals and then identifies the strength of the interference signals. According to the strength of the external signal, the micro-control module issues an instruction whether or not high-order filtering is required for interference suppression. When the double-band interference suppression scheme is implemented, the bands of external interference signals are two of 3.5 GHz band, 4.9 GHz band and 5.5 GHz band. Firstly, when there are two types of external interference signals, an interference suppression instruction is sent out, and the micro-control module starts a double-band first-order interference suppression scheme. Namely, in the three regions of the first region 101, the second region 102 and the third region 201, a bandstop filtering switch of each group of different resonant frequencies of two regions needs to be switched on. This scheme corresponds to 18 of the 36 states in this Scenario (3): A1B2 D3, A1C2 D3, A1D2 B3, A1D2 C3, B1A2 D3, B1C2 D3, B1D2 A3, B1D2 C3, C1A2 D3, C1B2 D3, C1D2 A3, C1D2 B3, D1A2 B3, D1A2 C3, D1B2 A3, D1 B2 C3, D1C2 A3, D1C2 B3. That is, the first-order interference suppression scheme has 18 ways to suppress signal interference. Since two of the three bands are involved, every two interference bands occur simultaneously, and there are 12 ways to perform the first-order interference suppression. Each of these 12 modes, when executed, externally exhibits a first-order bandstop filtering state of two different specific bands.

After executing the double-band first-order interference suppression scheme, the micro-control unit judges whether the receiver has reached the interference suppression criterion. If the criteria for interference suppression are met, processing of the external signal into the receiver ends. If the standard of interference suppression is not met, it is necessary to perform feedback reprocessing on the interference suppression of the receiver by the interference signal, and the micro-control module starts a single-band second-order interference suppression scheme. That is, the first region 101, the second region 102 the second region 102 and the third region 201 require a group of bandstop filtering switches of the not same resonant frequency of two regions to be simultaneously switched on. In order to increase the strength of one of the bandstop filters, the bandstop filters with the same resonant frequency of a last group of regions are also switched on simultaneously. This scheme corresponds to 18 of the 36 states in this Scenario (2): A1A2 B3, A1A2 C3, A1B2 A3, A1B2 B3, A1C2 A3, A1C2 C3, B1A2 A3, B1A2 B3, B1B2 A3, B1B2 C3, B1C2 B3, B1C2 C3, C1A2 A3, C1A2 C3, C1B2 B3, C1B2 C3, C1C2 A3, C1C2 B3. That is, the second-order interference suppression scheme also has 18 ways to suppress signal interference. The adopting of the double-band second-order filtering interference suppression scheme is on condition that the first-order filtering interference suppression scheme may not meet the interference suppression standard. The interference suppression scheme increases the strength of interference suppression as much as possible, so as to meet the requirements of final interference suppression. After the feedback double-band second-order filtering interference suppression scheme is adopted, the interference suppression of the UWB receiver is completed, and the processing of the single external interference signal entering the receiver ends.

In a specific implementation, the triple-band third-order filtering interference suppression scheme comprises performing switch switching on the first group, the second group and the third group of bandstop filtering switches to form a triple-bandstop filtering, wherein the triple-bandstop filtering has 6 states.

When there are three types of external interference signals, the UWB receiver implements a triple-band interference suppression scheme. When the triple-band interference suppression scheme is implemented, the external interference signals are 3.5 GHz band, 4.9 GHz band and 5.5 GHz band. When three types of external interference signals enter, an interference suppression instruction is sent out, and the micro-control module starts a triple-band first-order interference suppression scheme. Namely, each group of bandstop filtering switches of different resonant frequencies in each of the three regions, the first region 101, the second region 102 and the third region 201, are switched on. The scheme corresponds to 6 states in the triple-band interference filtering of this Scenario (4): A1B2 C3, A1C2 B3, B1A2 C3, B1C2 A3, C1A2 B3, C1B2 A3. After the feedback triple-band first-order filtering interference suppression scheme is adopted, the interference suppression of the UWB receiver is completed, and the processing of three external interference signals entering the receiver ends. Compared to the prior art, the technical solutions of embodiments of the present invention have the following advantageous effects.

The embodiments of the present invention provide an adaptive method for a multi-order multi-band anti-interference intelligent UWB antenna, including: acquiring a band of an interference source, wherein the band of the interference source includes a single band, a double band and a triple band; when the interference source is a single band, starting a single-band first-order filtering interference suppression scheme; when the single-band first-order filtering interference suppression scheme does not reach a suppression standard, starting a single-band second-order filtering interference suppression scheme; when the single-band second-order filtering interference suppression scheme does not reach the suppression standard, starting a single-band third-order filtering interference suppression scheme; when the interference source is a double band, starting a double-band first-order filtering interference suppression scheme; when the double-band first-order filtering interference suppression scheme does not reach the suppression standard, starting a double-band second-order filtering interference suppression scheme; and when the interference source is a triple band, starting a triple-band third-order filtering interference suppression scheme. The interference suppression scheme includes controlling the switching of the first group of bandstop filtering switches of the first region, the second group of bandstop filtering switches of the second region and the third group of bandstop filtering switches in the third region, thereby achieving the suppression of external interference signals by the multi-order and multi-band of the UWB receiver by implementing different multi-order filtering interference suppression schemes for different band interference sources.

Finally, it should be noted that each embodiment above are only intended to illustrate the technical solution of the invention, but not to limit it. Although the invention has been described in detail with reference to the each foregoing embodiment, those skilled in the art will appreciate that the technical solutions of the each above-mentioned embodiment can still be modified, or some of the technical features thereof can be equivalently substituted. Such modifications and substitutions will not cause the essence of the corresponding technical solutions to depart from the scope of the embodiments of the invention.

The invention claimed is:

1. An adaptive method for a multi-order multi-band anti-interference intelligent Ultra Wide Band (UWB) antenna, characterized by comprising:
acquiring a band of an interference source, wherein the band of the interference source comprises a single band, a double band and a triple band;
when the interference source is a single band, starting a single-band first-order filtering interference suppression scheme; when the single-band first-order filtering interference suppression scheme does not reach a suppression standard, starting a single-band second-order filtering interference suppression scheme; when the single-band second-order filtering interference suppression scheme does not reach the suppression standard, starting a single-band third-order filtering interference suppression scheme;
when the interference source is a double band, starting a double-band first-order filtering interference suppression scheme; when the double-band first-order filtering interference suppression scheme does not reach the suppression standard, starting a double-band second-order filtering interference suppression scheme;
when the interference source is a triple band, starting a triple-band third-order filtering interference suppression scheme;
wherein the interference suppression schemes comprise controlling switching of a first group of bandstop filtering switches of a first region, a second group of bandstop filtering switches of a second region and a third group of bandstop filtering switches of a third region;
the first group of bandstop filtering switches comprises a first filter, a second filter and a third filter; states formed by the first, second and third filters after switching comprise forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed;
the second group of bandstop filtering switches comprises a fourth filter, a fifth filter and a sixth filter; states formed by the fourth, fifth and sixth filters after switching comprise forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed;
the third group of bandstop filtering switches comprises a seventh filter, an eighth filter and a ninth filter; and states formed by the seventh, eighth and ninth filters after switching comprise forming a bandstop filtering state with a center frequency of 3.5 GHz, forming a bandstop filtering state with a center frequency of 4.9 GHz, forming a bandstop filtering state with a center frequency of 5.5 GHz, and forming a state where no filtering is formed.

2. The adaptive method for the multi-order multi-band anti-interference intelligent UWB antenna according to claim 1, characterized in that the bands of the interference source include 3.5 GHz, 4.9 GHz and 5.5 GHz.

3. The adaptive method for the multi-order multi-band anti-interference intelligent UWB antenna according to claim 1, characterized in that the first region is a printed monopole antenna on-board region; the second region is a microstrip feed conduction band side region; and the third region is a metal floor.

4. The adaptive method for the multi-order multi-band anti-interference intelligent UWB antenna according to claim 3, characterized in that the first group of bandstop filtering switches, the second group of bandstop filtering switches and the third group of bandstop filtering switches are formed by etching a plurality of gaps or loading a plurality of metal branches on the antenna to generate resonance using the plurality of gaps or the plurality of metal branches.

5. The adaptive method for the multi-order multi-band anti-interference intelligent UWB antenna according to claim 1, characterized in that 64 states are formed after switching the first group, the second group and the third group of bandstop filtering switches, wherein 1 state is bandstop-free filtering, 21 states are single-bandstop filtering, 36 states are double-bandstop filtering, and 6 states are triple-bandstop filtering.

6. The adaptive method for the multi-order multi-band anti-interference intelligent UWB antenna according to claim 5, characterized in that the single-band first-order filtering interference suppression scheme comprises performing switch switching on one group of the first group, the second group and the third group of bandstop filtering switches to form a single-bandstop filtering, wherein the single-bandstop filtering has 9 states;

the single-band second-order filtering interference suppression scheme comprises performing switch switching on two groups of the first group, the second group and the third group of the bandstop filtering switches to form a single-bandstop filtering, wherein the single-bandstop filtering has 9 states; and the single-band third-order filtering interference suppression scheme comprises performing switch switching on the first group, the second group and the third group of bandstop filtering switches to form a single-bandstop filtering, wherein the single-bandstop filtering has three states.

7. The adaptive method for the multi-order multi-band anti-interference intelligent UWB antenna according to claim 5, characterized in that the double-band first-order filtering interference suppression scheme comprises performing switch switching on two groups of the first group, the second group and the third group of the bandstop filtering switches to form a double-bandstop filtering, wherein the double-bandstop filtering has 9 states; and the double-band second-order filtering interference suppression scheme comprises performing switch switching on the first group, the second group and the third group of bandstop filtering switches to form a double-bandstop filtering, wherein the double-bandstop filtering has 9 states.

8. The adaptive method for the multi-order multi-band anti-interference intelligent UWB antenna according to claim 5, characterized in that the triple-band third-order filtering interference suppression scheme comprises performing switch switching on the first group, the second group and the third group of bandstop filtering switches to form a triple-bandstop filtering, wherein the triple-bandstop filtering has 6 states.

9. The adaptive method for the multi-order multi-band anti-interference intelligent UWB antenna according to claim 1, characterized in that the first group of bandstop filtering switches of the first region, the second group of bandstop filtering switches of the second region and the third group of bandstop filtering switches of the third region are switched by micro-control module (MCU) feedback control.

* * * * *